March 25, 1930.  L. B. HUNTINGTON  1,752,088
ARTIFICIAL BAIT
Filed April 4, 1928
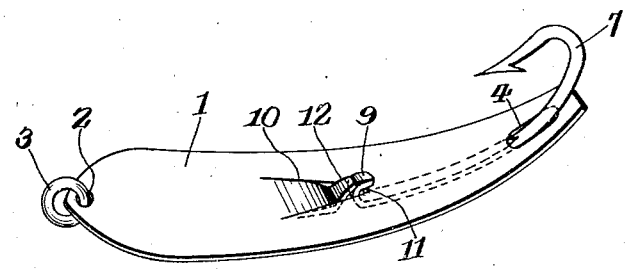
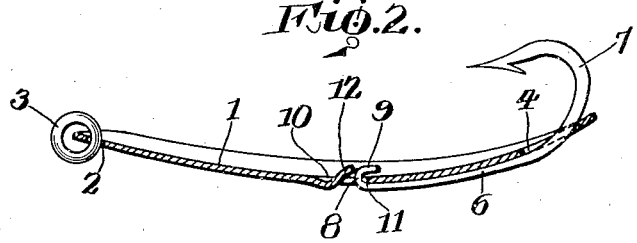
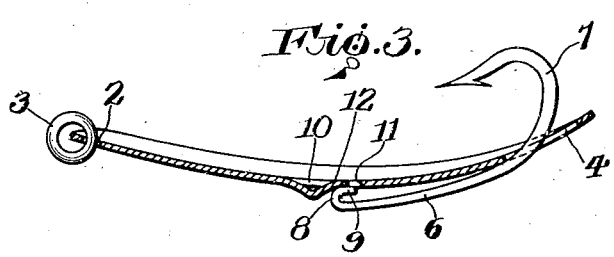
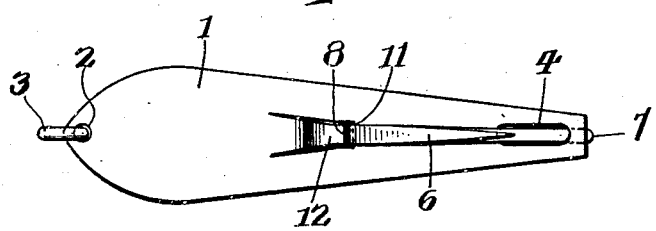
INVENTOR.
Levin B. Huntington,
BY
Geo. F. Kimmel
ATTORNEY.

Patented Mar. 25, 1930

1,752,088

UNITED STATES PATENT OFFICE

LEVIN B. HUNTINGTON, OF ANNAPOLIS, MARYLAND

ARTIFICIAL BAIT

Application filed April 4, 1928. Serial No. 267,329.

This invention relates to artifical fish baits or lures and more particularly to an improvement on the device disclosed in the application filed by me in the Patent Office on March 24, 1928, bearing Serial Number 264,364, and not only embodies the objects and advantages present in the aforementioned application, but has for its further object to provide a spoon having as an inherent part thereof, a resilient latch to enable the convenient coupling and uncoupling of the hook with respect to the spoon.

A further object of the invention is to provide a device of the character set forth which is simple in construction, strong, durable, efficient in its use and manufactured at low cost.

Other objects and advantages of the invention will be apparent from a study of the following specification, taken in connection with the accompanying drawings, wherein like reference characters designate corresponding parts throughout the several views.

In the drawings:

Figure 1 is a perspective view of an artificial bait in accordance with this invention.

Figure 2 is a longitudinal sectional view showing the hook secured in position on the spoon.

Figure 3 is a longitudinal sectional view showing the hook released from the retaining tongue carried by the spoon, and Figure 4 is a bottom plan view of the invention.

Referring to the drawings in detail, the reference 1 designates the body portion of a lure or bait spoon, formed preferably of metal, and having an opening 2 at its forward end for the passage of a ring 3 for the purpose of attaching a fishing line thereto. The spoon has the general outline of the handle portion of a table spoon and is otherwise concavo-convex in form.

The spoon 1 is provided, at its longitudinal center and near its rear end with a longitudinal elongated opening 4 for the passage of the flattened shank portion 6 of a hook 7. The opening 4 is adapted to permit the shank 6 to be directed forwardly against the lower convex face of the spoon 1 after said shank has been passed through said opening. The forward end of the shank 6 is provided with an angularly disposed protuberance 8 which terminates in a nose 9 extending rearwardly toward the bill of the hook.

Intermediate the openings 4 and 2, the spoon 1 is further provided with a substantially tapered slit 10 having the opposite sides thereof converging rearwardly to a point forwardly of the rear end 11 of said slit. The material freed by the slit 10 provides a resilient retaining tongue 12 which extends longitudinally of the spoon and with the tongue formed to terminate at a point forwardly of the end 11 of said slit. The tongue 12 is directed outwardly on an inclination from the convex face of the spoon 1 for a distance rearwardly of its point of mergence with said spoon, and is then bent inwardly at an inclination toward the spoon in such manner that the rear end thereof will normally lie between the sides of the slit and be substantially flush with the upper face of said spoon, as clearly shown in Figure 3.

The manner of mounting the hook on the spoon is as follows:

The protuberance 8 and nose 9 on the end of the shank 6 are manipulated through the opening 4 in the spoon and the said shank is passed therethrough until the flattened portion thereof has passed through the opening. The shank 6 is then directed forwardly against the convex face of the spoon 1 in such a manner that the parts 8 and 9 register with the rear portion of the slit. Pressure is then exerted upon the forward end of the shank 6 for the purpose of flexing same and projecting the parts 8 and 9 through the slit 10 until the free end of the part 9 is in a plane above the adjacent surface of the spoon. When pressed upwardly through the slit 10, the parts 8 and 9 engage the resilient retaining tongue 12 at its free end and force same upwardly through said slit.

Still maintaining the pressure thereon, the shank 6 is slid rearwardly on the spoon 1 until the part 8 engages the rear end 11 of the slit 10. In this position, the nose 9 will overlie the upper surface of the spoon. The pressure on the shank 6 is then removed and when said shank springs outwardly toward its normally straight position, the nose 9 engages the upper surface of the spoon 1 and limits such outward movement. In this position the broad flat face of the shank 6 presses tightly against the convex lower side of the spoon and prevents the hook from turning thereon. As shown in Figure 2, the free end of the tongue 12 engages and presses rearwardly against the parts 8 and 9 for the purpose of preventing the hook from being accidentally slid forward and becoming released from the spoon. From the foregoing, it will be apparent that I have provided an artificial bait wherein the parts may be expeditiously assembled and which will permit the replacement of either of the parts thereof in case same should become lost or damaged.

It is thought that the many advantages of an artificial bait constructed in accordance with this invention will be readily understood, and although the preferred embodiment of the invention is as illustrated and described, it is to be understood that changes in the details of construction may be made which will fall within the scope of the appended claims.

What is claimed is:

1. An artificial bait comprising a body portion having an opening and a slit forwardly of the opening for the passage of a hook, said opening and slit providing means for mounting the hook upon said body portion, and said body portion further having an integral part thereof providing a resilient retaining tongue extending into the slit for securing the hook to the body portion, said tongue being bent first away from said body and then reversely towards said body portion and extending into said slit to engage the hook for latching it upon the body portion.

2. An artificial bait comprising a body portion having an opening and a slit for the passage of a hook, a hook having a shank extending through the opening, an angularly disposed protuberance, terminating in a rearwardly extending nose portion, formed on the free end of said shank and adapted to coact with the slit for mounting the hook on the body portion, and a resilient tongue formed on the body portion and adapted to engage the protuberance for the purpose of securing the hook in position upon the body portion.

In testimony whereof, I affix my signature hereto.

LEVIN B. HUNTINGTON.